(12) United States Patent
Plumpton et al.

(10) Patent No.: US 9,776,349 B2
(45) Date of Patent: Oct. 3, 2017

(54) SYSTEM FOR CONTROLLING THE CLOSING SPEED OF VALVE GATED NOZZLES

(71) Applicant: Husky Injection Molding Systems Ltd., Bolton (CA)

(72) Inventors: James Osborne Plumpton, Enosburg Falls, VT (US); Sarah Kathleen Overfield, Colchester, VT (US); Abdeslam Bouti, St. Albans, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 200 days.

(21) Appl. No.: 14/762,515

(22) PCT Filed: Jan. 28, 2014

(86) PCT No.: PCT/US2014/013265
§ 371 (c)(1),
(2) Date: Jul. 22, 2015

(87) PCT Pub. No.: WO2014/120629
PCT Pub. Date: Aug. 7, 2014

(65) Prior Publication Data
US 2015/0360403 A1    Dec. 17, 2015

Related U.S. Application Data

(60) Provisional application No. 61/758,305, filed on Jan. 30, 2013.

(51) Int. Cl.
  *B29C 45/76*  (2006.01)
  *B29C 45/23*  (2006.01)
  (Continued)

(52) U.S. Cl.
  CPC ............ *B29C 45/231* (2013.01); *B29C 45/22* (2013.01); *B29C 45/2806* (2013.01);
  (Continued)

(58) Field of Classification Search
  CPC B29C 2945/76598; B29C 2945/76755; B29C 2945/76862; B29C 45/22;
  (Continued)

(56) References Cited

U.S. PATENT DOCUMENTS

2003/0012845 A1    1/2003  Doyle et al.
2005/0233028 A1*  10/2005  Ciccone ................ B29C 45/281
                                            425/572
(Continued)

FOREIGN PATENT DOCUMENTS

DE         19956215 A1     6/2001
JP         2002-292683      * 10/2002

OTHER PUBLICATIONS

Electronic translation of JP 2002-292683.*
(Continued)

*Primary Examiner* — Jill Heitbrink

(57) ABSTRACT

Systems and methods for controlling the closing speed of valve gated nozzles are disclosed. In one embodiment, a hot runner have a valve gated nozzle including a valve stem movable between an open position and a closed position is provided. The valve stem is moved at a first speed for a first portion of valve stem closure and a second speed for a second end portion of the valve stem closure.

20 Claims, 4 Drawing Sheets

(51) Int. Cl.
*B29C 45/28* (2006.01)
*B29C 45/22* (2006.01)
*B29C 45/77* (2006.01)
*B29K 23/00* (2006.01)

(52) U.S. Cl.
CPC .............. *B29C 45/76* (2013.01); *B29C 45/77* (2013.01); *B29C 2945/76598* (2013.01); *B29C 2945/76755* (2013.01); *B29C 2945/76862* (2013.01); *B29C 2945/76943* (2013.01); *B29K 2023/12* (2013.01)

(58) Field of Classification Search
CPC . B29C 45/231; B29C 45/2806; B29C 45/281; B29C 2045/2872
See application file for complete search history.

(56) References Cited

U.S. PATENT DOCUMENTS

2009/0100962 A1 4/2009 Uracz et al.
2012/0248644 A1 10/2012 De Oliveira Antunes et al.

OTHER PUBLICATIONS

International Search Report, dated May 21, 2014, 3 pages.
Kazmer D et al, "Multi-Cavity Pressure Control in the Filling and Packing Stages of the Injection Molding Process", Polymer Engineering and Science, Brookfield Center, US, vol. 37, No. 11, Nov. 1, 1997.
European Search Report, dated Sep. 29, 2016, 9 pages.

* cited by examiner

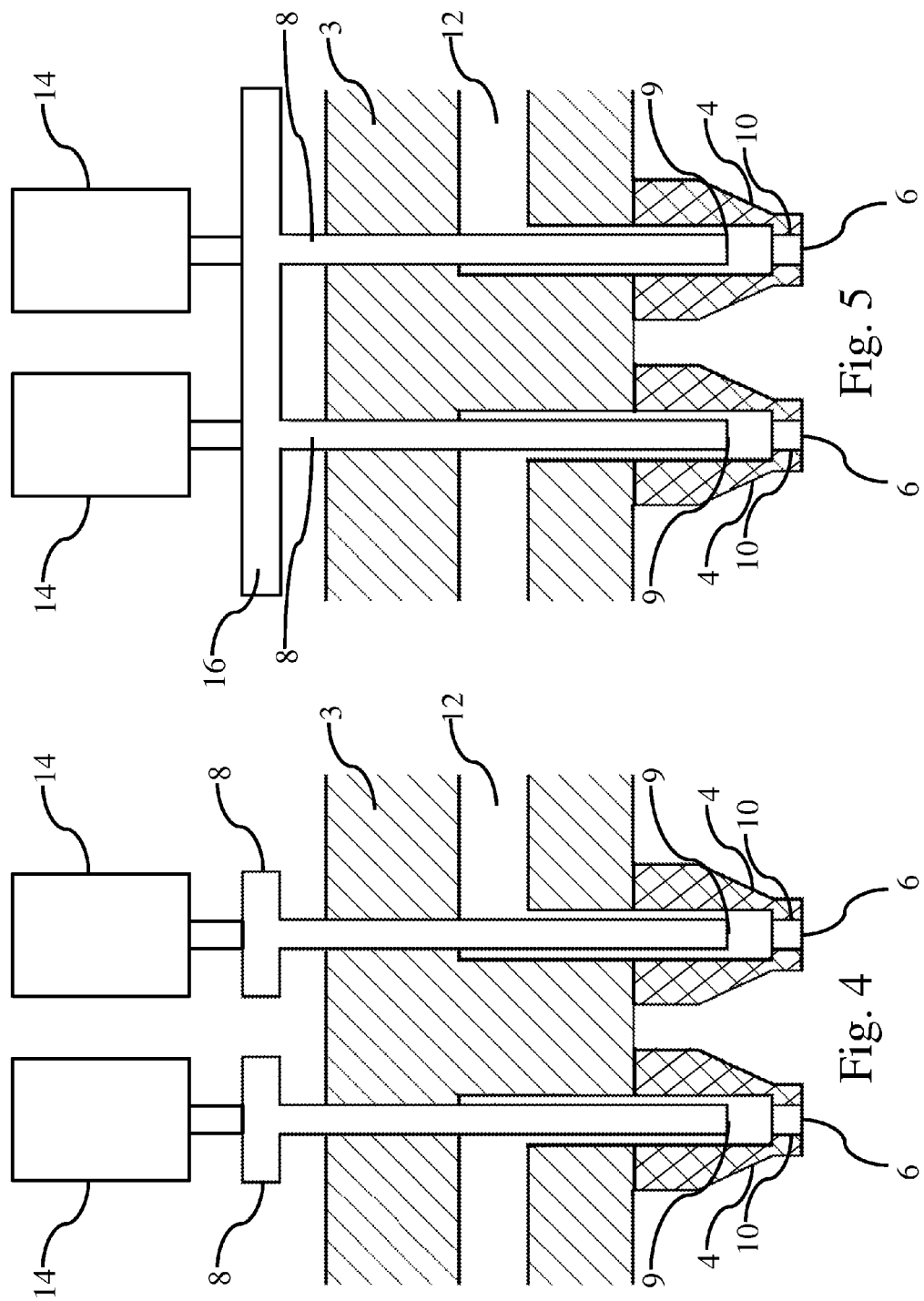

SYSTEM FOR CONTROLLING THE CLOSING SPEED OF VALVE GATED NOZZLES

FIELD

Disclosed embodiments are related to hot runner systems in injection molding machines, and more particularly to systems for controlling the closing speed of valve gated nozzles.

BACKGROUND

Hot runner systems in injection molding machines include either mechanically gated nozzles (i.e., valve gated nozzles) or thermally gated nozzles (i.e., hot tip nozzles). Valve gating typically provides a better quality gate on the surface of the injection molded part. However, even valve gated nozzles can cause remnants of plastic to be left on the part after de-molding (e.g., crown flash or vestige). This vestige can be especially problematic with particular resins such as polypropylene.

SUMMARY

In one embodiment, a method for molding a plastic part includes: providing a valve gated nozzle including a valve stem movable between an open position and a closed position; moving the at least one valve stem at a first speed for a first portion between the open position and the closed position; and moving the at least one valve stem at a second speed less than the first speed for a second portion between the open position and the closed position, wherein the second speed is less than a threshold speed, and wherein the second portion is between a final 10% and 70% of a distance between the open position and the closed position.

In another embodiment, a method for molding a plastic part includes: providing a valve gated nozzle including a valve stem movable between an open position and a closed position; moving the at least one valve stem at a first speed for a first portion between the open position and the closed position; and moving the valve stem at a second speed less than the first speed for at least a final 2 mm between the open position and the closed position.

It should be appreciated that the foregoing concepts, and additional concepts discussed below, may be arranged in any suitable combination, as the present disclosure is not limited in this respect.

The foregoing and other aspects, embodiments, and features of the present teachings can be more fully understood from the following description in conjunction with the accompanying drawings.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4 is a schematic representation of a portion of a hot runner showing separate valve stems, each operated with a corresponding actuator;

FIG. 5 is a schematic representation of separate valve stems that are operated simultaneously using an actuation plate arrangement.

DETAILED DESCRIPTION

The inventors have recognized that a pressure spike of a polymer melt occurs during the closure of the valve stem of a valve gated nozzle leading to increased remnant formation on the final de-molded part. Without wishing to be bound by theory, the pressure spike occurs as the valve stem is quickly moved into the corresponding gate. More specifically, the pressure spike may be due to the polymer melt being unable to flow around the valve stem during an end portion of valve stem closure, such as when the valve stem closes the gate. The inventors have recognized that if the valve stem is moved slowly enough to permit the polymer melt to flow around the valve stem during valve stem closure, the observed pressure spike may be reduced, or substantially eliminated. In view of the above, in one embodiment, the pressure spike may be reduced, or substantially eliminated, by moving the valve stem at a speed less than a threshold speed during at least an end portion of the valve stem closure. The resulting reduction in the pressure spike may result in a decreased remnant being formed on the final de-molded part resulting in improved part quality.

Without wishing to be bound by theory, in addition to reduced remnant formation, moving the valve stem at a speed less than the threshold speed during the end portion of valve stem closure may also provide a substantially constant polymer melt pressure during valve stem closure. In some embodiments, maintaining a substantially constant polymer melt pressure during valve stem closure may facilitate uniform mold packing, reduce polymer orientation within the gate region, reduce nonuniform residual stresses within the gate region, and other benefits as would be understood by one of ordinary skill in the art.

Figure 1B:
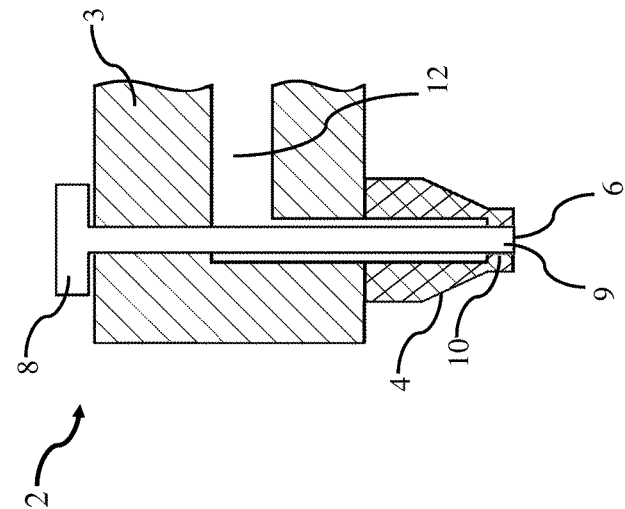
FIG. 1B is a schematic representation of the hot runner of FIG. 1A with the valve stem shown in the closed position.
Figure 1A:
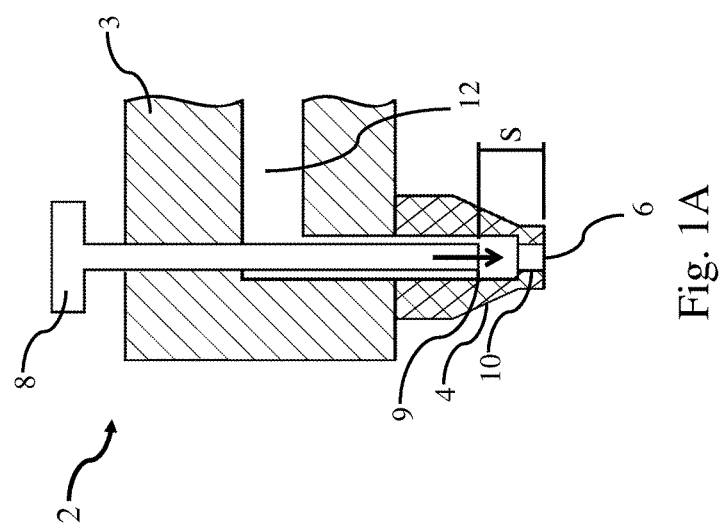
FIG. 1A is a schematic representation of a portion of a hot runner with a valve gated nozzle including a valve stem shown in the open position.

Turning now to FIGS. 1A and 1B, one embodiment of a valve gated hot runner and associated nozzle are described. In the depicted embodiment, a valve gated hot runner 2 includes a manifold 3, a nozzle 4 with a nozzle outlet 6. As is well known, a valve stem 8 is associated with nozzle 4 such that it may be selectively moved between a retracted open position (FIG. 1A) and a forward closed position (FIG. 1B). When the valve stem is located in the retracted open position, the polymer melt is free to flow from melt channel 12 to outlet 6. Correspondingly, when the valve stem is located in the forward closed position, the forward end 9 of the valve stem 8 blocks gate 10 to selectively substantially prevent flow of the polymer melt from melt channel 12 to outlet 6. Other components of the nozzle and hot runner are not depicted or described for the sake of clarity. However one of skill in the art will appreciate the possible inclusion of one or more of these components. Examples of such components are described in co-owned U.S. Pat. Nos. 6,669,462 and 8,142,183, each of which is hereby incorporated by reference herein.

Without wishing to be bound by theory, the observed change in pressure during valve stem closure is related to the speed at which the valve stem moves through the polymer melt during an end portion or phase of the valve stem closure. As the valve stem is moved between the open and closed positions, the valve stem locally deforms the polymer melt creating localized pressure gradients (i.e. localized stresses) within the polymer melt. These localized pressure gradients are relaxed over time at a given relaxation rate due to any number of different relaxation mechanisms. The relaxation rate of the polymer melt may vary depending on the processing parameters used including processing temperature, plasticizers, deformation rate (e.g. shear thickening and shear thinning polymers), and/or other appropriate parameters. As the valve stem speed increases, a corresponding increase in the localized deformation rate of the polymer melt results. When the localized deformation rate of the polymer melt is greater than the relaxation rate of the polymer melt, a localized region of greater pressure may be formed adjacent to, and in front of, the valve stem due to the polymer being unable to relax at a fast enough rate to accommodate the induced deformation (i.e. flow around the valve stem). This will in effect create a plug like flow of polymer in front of the valve stem at an increased pressure. As the valve stem approaches the closed position, this plug like flow of polymer enters the nozzle outlet 6 resulting in the observed pressure spike and increased remnant.

Without wishing to be bound by theory, the inventors have recognized that when the deformation rate of the polymer melt is approximately less than or equal to the relaxation rate of the polymer, the polymer melt is able to relax at a rate fast enough to permit the polymer melt to flow around the valve stem and substantially avoid creating a pressure spike. With regards to a stress gradient applied to a polymer melt, the relaxation rate may be viewed generally as the rate at which the stress gradient relaxes towards an equilibrium state or dynamic equilibrium state in the case of an applied deformation rate. Physically, this may correspond to any number of different physical phenomenon including, but not limited to, rearrangement of the polymer molecules to accommodate the applied stress gradient. In instances where an object, such as the valve stem, is moving through a polymer melt, a constant deformation rate is applied to the polymer melt. This deformation rate results in rearrangement of the polymer molecules, and in instances where the deformation rate is less than or equal to the relaxation rate, this rearrangement of the polymer molecules may correspond to the polymer flowing around the moving object. Higher viscosities will correspond to slower relaxation rates and lower viscosities will correspond to faster relaxation rates.

In one embodiment, during at least an end portion of the valve stem closure, the valve stem is moved at a speed less than a threshold speed such that the deformation rate of the polymer melt due to movement of the valve stem is less than or approximately equal to the relaxation rate of the polymer melt. Since the polymer melt is able to essentially flow out of the way of the forward end of the valve stem, when the valve stem is moved at a speed less than the threshold speed, the displaced material may flow backwards towards melt channel 12 instead of being forced through nozzle outlet 6 and creating a pressure spike. Thus, moving the valve stem at a speed that is less than or equal to the threshold speed during an end portion of the valve stem closure may reduce, or substantially eliminate, the observed pressure spike.

It should be noted that the threshold speed is not an absolute parameter. Instead, the threshold speed may depend on any number of different parameters. For example, the threshold speed may depend on: various component geometries; the processing parameters of the specific polymer melt which may affect the relaxation rate (e.g. polymer type, processing temperature, plasticizers, deformation rate, and any other appropriate processing parameters); and/or any other appropriate parameters as would be apparent to one of ordinary skill in the art. Therefore, the threshold speed should be viewed more generally as the speed below which a substantial pressure spike during valve stem closure is not observed.

Turning again to FIGS. 1A and 1B, one embodiment of a valve stem actuation between the open and closed position is described. During a first portion or phase of the valve stem closure, valve stem 8 moves at a first speed that is approximately greater than the threshold speed. The valve stem is subsequently slowed to a second speed that is less than or equal to the threshold speed during a second portion or phase of the valve stem closure. In some embodiments, the second phase corresponds to an end portion of the distance between the open and closed positions of the valve stem. As depicted in the figures, the valve stem is slowed at a preselected distance S from full closure of valve stem 8 with gate 10. The first and second speeds, as well as the distance S, may be selected such that the pressure spike is reduced, or substantially eliminated.

The specific threshold speed, and the desired distance S at which the valve stem speed is reduced, may depend upon: the first valve stem closure speed; various component geometries; the processing parameters of the specific polymer melt which may affect the relaxation rate (e.g. polymer type, processing temperature, plasticizers, and any other appropriate processing parameters); and/or any other appropriate parameters as would be apparent to one of ordinary skill in the art.

Without wishing to be bound by theory, several nonlimiting examples of ways in which the threshold speed and or distance S may be controlled are detailed below. For example, raising the polymer melt temperature will result in an increased threshold speed due to an increased relaxation rate of the polymer. Similarly, the use of plasticizers, which result in increased fluidly and an increased relaxation rate of the polymer melt, also result in an increased threshold speed. In another example, faster first valve stem closure speeds result in a pressure spike occurring during an earlier portion of the valve stem closure due to increased deformation rates of the polymer versus relaxation rate. To avoid the pressure spike occurring in an earlier portion of the valve stem closure, the valve stem may also be slowed at an earlier point during valve stem closure (i.e., an increased distance S). While specific parameters and their relations to the threshold speed and distance S have been detailed above, other processing parameters may also be used to determine and set the threshold speed and distance S as the current disclosure is not limited to only those parameters noted herein.

While any appropriate first valve stem closure speed may be used, in some embodiments, the first speed of the valve stem during valve stem closure is greater than or equal to approximately 10 mm/s, 20 mm/s, 30 mm/s, 40 mm/s, 50 mm/s, 60 mm/s, 70 mm/s, 80 mm/s, 90 mm/s, or any other appropriate speed. The above minimum speed for the first speed of the valve stem during valve stem closure may be used in combination with a maximum speed. For example, the first speed of the valve stem during valve stem closure may also be less than approximately 100 mm/s, 90 mm/s, 80 mm/s, 70 mm/s, 60 mm/s, 50 mm/s, 40 mm/s, 30 mm/s, 20 mm/s, or any other appropriate speed. Combinations of the above ranges are possible (e.g., the first speed of the valve stem may be greater than or equal to approximately 10 mm/s and less than or equal to approximately 100 mm/s). Other combinations are also possible, as the present disclosure is not limited in this respect.

As described above, appropriate second valve stem closure speeds may be less than or equal to the threshold speed which may depend on the particular polymer and the various processing parameters noted above. However, in some embodiments, the second speed may be greater than or equal to approximately 0.5 mm/s, 1 mm/s, 2 mm/s, 3 mm/s, 4 mm/s, or any other appropriate speed for which the polymer melt pressure remains substantially constant during at least an end portion of the valve stem closure. The above minimum speed for the second speed of the valve stem during valve stem closure may be used in combination with a maximum speed. For example, the second speed of the valve stem may also be less than or equal to approximately 5 mm/s, 4 mm/s, 3 mm/s, 2 mm/sec, 1 mm/s, or any other appropriate speed for which the polymer melt pressure remains substantially constant during at least an end portion of the valve stem closure. Combinations of the above ranges are possible (e.g., the second speed of the valve stem may be greater than or equal to approximately 0.5 mm/s and less than or equal to approximately 5 mm/s). Other combinations are also possible, as the present disclosure is not limited in this respect.

In some embodiments, the threshold speed for a particular polymer and set of processing parameters may be greater than or equal to approximately 2 mm/s, 3 mm/s, 4 mm/s, 5 mm/s, 10 mm/s, 20 mm/s, 30 mm/s, 40 mm/s, or any other appropriate speed as described above. The above minimum speed for the threshold speed may be used in combination with a maximum speed. For example, the threshold speed may also be less than or equal to approximately 50 mm/s, 40 mm/s, 30 mm/s, 20 mm/sec, 10 mm/s, 5 mm/s or any other appropriate speed as described above. Combinations of the above ranges are possible (e.g., the threshold may be greater than or equal to approximately 5 mm/s and less than or equal to approximately 50 mm/s). Other combinations are also possible, as the present disclosure is not limited in this respect.

In one embodiment, the second portion of the valve stem closure is an end portion of the valve stem closure corresponding to any appropriate length or percentage of the distance between the valve stem open and closed positions that permits the polymer melt pressure to remain substantially constant during valve stem closure. In some embodiments, the second portion of the valve stem closure may correspond to at least a final 2 mm, 3 mm, 4 mm, 5 mm, or any other appropriate length of the valve stem closure. The above minimum length for the second portion may be used in combination with a maximum length. For example, the second portion of the valve stem closure may also be less than a final 10 mm, 9 mm, 8 mm, 7 mm, 6 mm, 5 mm, or any other appropriate length of the valve stem closure. Combinations of the above ranges are possible (e.g., greater than approximately a final 2 mm and less than approximately a final 5 mm of the valve stem closure). In an alternate set of embodiments, the second portion of the valve stem closure may be greater than or equal to approximately a final 5%, 10%, 20%, 30%, 40%, 50%, or any other appropriate percentage of the valve stem closure. The above minimum percentage for the second portion may be used in combination with a maximum percentage. For example, the second portion of the valve stem closure may also be less than or equal to approximately a final 70%, 60%, 50%, 40%, 30%, 20%, 10%, or any other appropriate percentage of the valve stem closure. For example, the second portion of the valve stem closure may be greater than or equal to approximately a final 10% of the valve stem closure and less than or equal to approximately a final 70% of the valve stem closure. Other combinations in addition to the combinations of lengths and percentages noted above are also possible, as the present disclosure is not limited in this respect.

In yet another embodiment, the valve stem stroke length between the open position and a closed position may be greater than 1 mm, 1.5 mm, 2 mm, 2.5 mm, 3 mm, 4 mm, 5 mm, or any other appropriate stroke length. The above minimum length for the valve stem stroke length may be used in combination with a maximum length. For example, the valve stem stroke length may also be less than a final 10 mm, 9 mm, 8 mm, 7 mm, 6 mm, 5 mm, 4 mm, 3 mm, or any other appropriate length. Combinations of the above ranges are possible (e.g., a valve stem stroke length greater than approximately 2 mm and less than approximately 10 mm). Other combinations in addition to the combinations of lengths noted above are also possible, as the present disclosure is not limited in this respect.

In some embodiments, it is desirable to maintain the molding cycle time of an injection molding system implementing the current disclosure to avoid a reduction in production capacity of the system. However, depending on the particular embodiment, the valve stem has a reduced closure speed during at least a portion of the valve stem closure which results in increased valve stem closure times. In some instances, the valve stem may simply close during a later portion of the molding cycle. For example, the valve stem might close at a later time during the mold cooling portion of the molding cycle. Alternatively, to compensate for the increased valve stem closure time, the valve stem actuation between the open and closed positions may be begun earlier in the molding process to accommodate the increased valve stem closure time. In either case, the molding cycle time of a valve gated hot runner and an associated mold may remain substantially the same while the closure time of the valve stem between the open and closed position is increased. It should be understood that any appropriate molding cycle time may be used. For example, a molding system might have a molding cycle time that is greater than approximately 2 sec, 3 sec, 4 sec, 5 sec, 10 sec, 15 sec, 20 sec, or any other appropriate molding cycle time. The above minimum molding cycle times may be used in combination with a maximum molding cycle time. For example, the molding cycle time may be less than approximately 30 sec, 25 sec, 20 sec, 15 sec, 10 sec, 5 sec, or any other appropriate molding cycle time. Combinations of the above ranges are possible (e.g., a molding cycle time greater than approximately 2 sec and less than approximately 30 sec). Other combinations in addition to the combinations of molding cycle times noted above are also possible, as the present disclosure is not limited in this respect.

Figure 2:
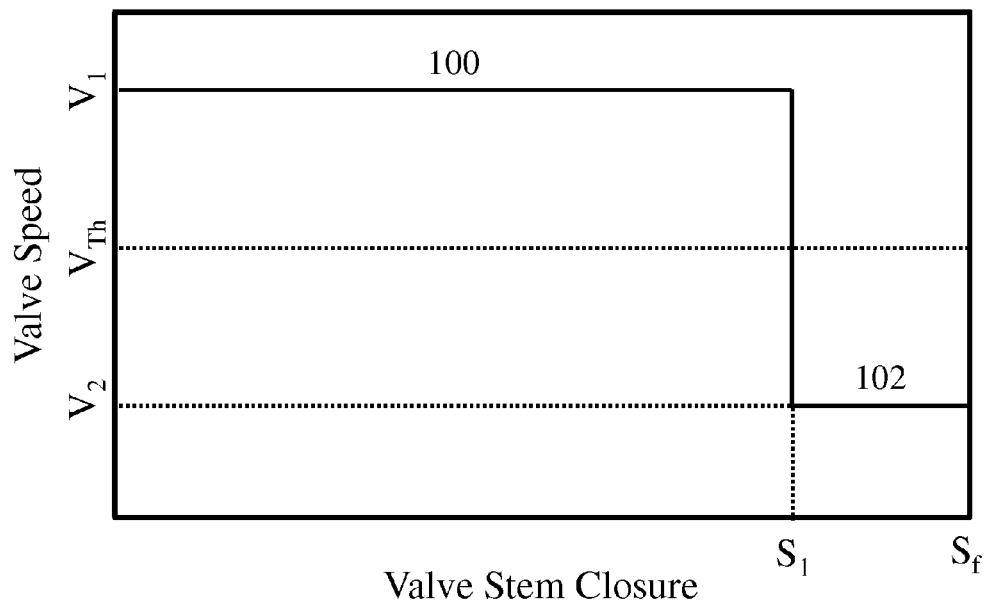
FIGS. 2 and 3 are graphs of exemplary valve stem closing speed profiles.
Figure 3:
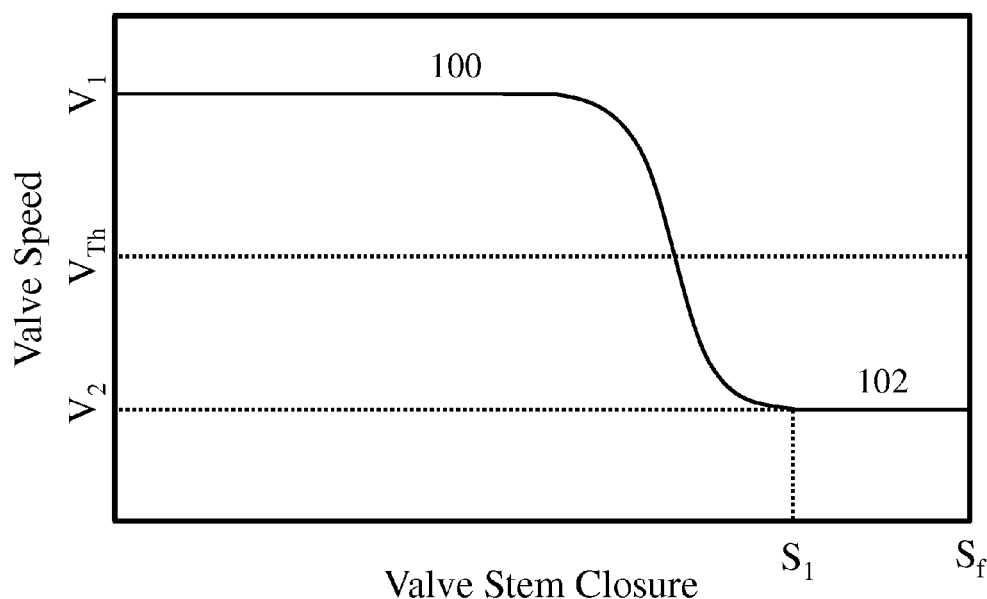

FIGS. 2 and 3 depict exemplary profiles of the valve stem speed versus valve stem closure. The depicted valve stem closure profiles include substantially constant first speeds $V_1$ that are greater than the threshold speed $V_{Th}$ for a first portion or phase 100 of the valve stem closure extending from the beginning of valve stem closure to a predetermined position $S_1$. Once the valve stem has reached predetermined position $S_1$, the valve stem speed is reduced to a second speed $V_2$ that is less than, or substantially equal to, the threshold speed $V_{Th}$. The second speed $V_2$ is then maintained at a substantially constant speed during the second portion of valve stem closure between $S_1$ and the final closed position corresponding to $S_f$. As depicted in FIG. 2 the transition between $V_1$ and $V_2$ may substantially correspond to a step function. However, as depicted in FIG. 3 the transition between $V_1$ and $V_2$ may include a transition that gradually changes the valve stem closure speed from $V_1$ to $V_2$. Such an embodiment may be advantageous in reducing the forces applied to the valve stem during actuation. Depending on the embodiment, an exponential, linear, non-linear, or any other appropriate profile could be used to transition between the first and second speeds as the current disclosure is not limited in this fashion. Further, in some embodiments the valve stem may simply move at a speed that is less than the threshold speed for the entire distance between the open and closed positions. Such an embodiment may be advantageous for valve stems having shorter valve stem stroke lengths such as less than or equal to 2 mm. However, it should be understood that such an embodiment may be applied to any valve stem stroke length.

While a valve stem closure with two discrete portions has been described above, and shown in the figures, a valve stem closure with any number of discrete portions with different valve stem speeds is also envisioned. For example, a valve stem closure might include three portions with three different speeds. Further, while a substantially constant $V_1$ and $V_2$ have been depicted, embodiments in which the speed varies during one or more of the valve stem closure portions are also envisioned. In addition, while both of the embodiments of the valve stem closure speed depicted in FIGS. 2 and 3 depict $V_2$ as being less than $V_{Th}$, it should be understood that $V_2$ may be approximately equal to $V_{Th}$ in some embodiments.

While the above embodiments have been directed to a single valve gated nozzle for clarity, it should be understood that a hot runner typically includes a plurality of nozzles and the operating scheme described above can be used for one, more than one, or all of the valve gated nozzles of a hot runner. Thus, as depicted in the embodiment of FIG. 4, a plurality of individual valve stems 8 are associated with a corresponding plurality of nozzles 4. Each of the depicted valve stems is associated with a corresponding actuator 14 which is configured and adapted to actuate the associated valve stem between the open and closed position. In such an embodiment, each valve stem is independently controlled. Alternatively, as depicted in FIG. 5 a plurality of valve stems 8 may be coupled to an actuation plate 16. Actuation plate 16 is then driven by one or more actuators 14. In such an embodiment, the plurality of valve stems is simultaneously actuated between the open and closed position by movement of actuator plate 16. In view of the above, it should be understood that the current disclosure is not limited to the arrangement utilized to actuate the valve stems.

It should be understood that actuators 14 may correspond to any appropriate actuation system including, but not limited to, hydraulic actuators, pneumatic actuators, electric actuators (e.g., electric servo motors and other appropriate electric actuators), and other appropriate systems. While any appropriate actuation system may be used, in one embodiment, one or more electric servo motors are used to control the valve stem speed throughout the entire valve stem stroke and provide a repeatable actuation profile. While it may be possible to obtain the desired performance characteristics using pneumatic and hydraulic systems, electric servo motors offer the benefits of decreased response times and accurate repeatable actuation control.

In one embodiment, an injection molding system may include a controller that controls the actuation of the one or more actuators associated with the valve stems. The controller may include instructions regarding valve stem actuation control according to the control methods disclosed herein. The controller may be embodied by any appropriate system including, but not limited to, an integrated processor and memory, an external processor and memory, a computer, or any other appropriate system. In some embodiments, the controller may be a plurality of controllers associated with one or more actuators such that the one or more actuators may be controlled individually or together. In addition, in some embodiments, a controller may not be a single computer or processor, but may be distributed in a modular fashion amongst a number of different computers or processors to implement various aspects of the controller. Further, in some embodiments, the different computers or processors making up the distributed controller may be located in different locations.

Since the generation of a pressure spike is sensitive to the speed and position of the valve stem during valve stem closure, it may be desirable to accurately control the speed and position of the valve stem to reduce the chance of generating a pressure spike. Thus in some embodiments, the controller may provide closed loop control of the valve stem actuation based on a sensed and/or calculated valve stem position and speed. While the controller may implement a closed loop control system, embodiments in which the controller implements an open loop control are also envisioned.

In one embodiment, the controller may receive inputs from various sensors that provide information regarding the valve stem location and speed throughout the valve stem actuation to enable a desired control strategy and/or enable monitoring of the processing conditions. Appropriate sensors include, but are not limited to, displacement transducers, contact sensors, extensometers, laser displacement sensors, and other appropriate sensors. Alternatively, or in addition to, the sensors, the control system may estimate the displacement and speed of the valve stem using the displacement commanded by the controller.

In some instances, it may also be desirable to permit a user to control and/or alter the valve stem closure profile to permit an injection molding system to be used for different injection processes and materials. In one such embodiment, the controller includes one or more preset valve stem closure profiles from which a user may select to control the speed profile of the valve stem closure. In another embodiment, the controller may be programmed by a user to provide a desired speed profile of the valve stem closure. In yet another embodiment, the controller may include one or more preset valve stem closure profiles from which a user may select and the user may enter desired performance characteristics such as valve stem closure speeds and distances over which the speeds are maintained.

Figure 6:
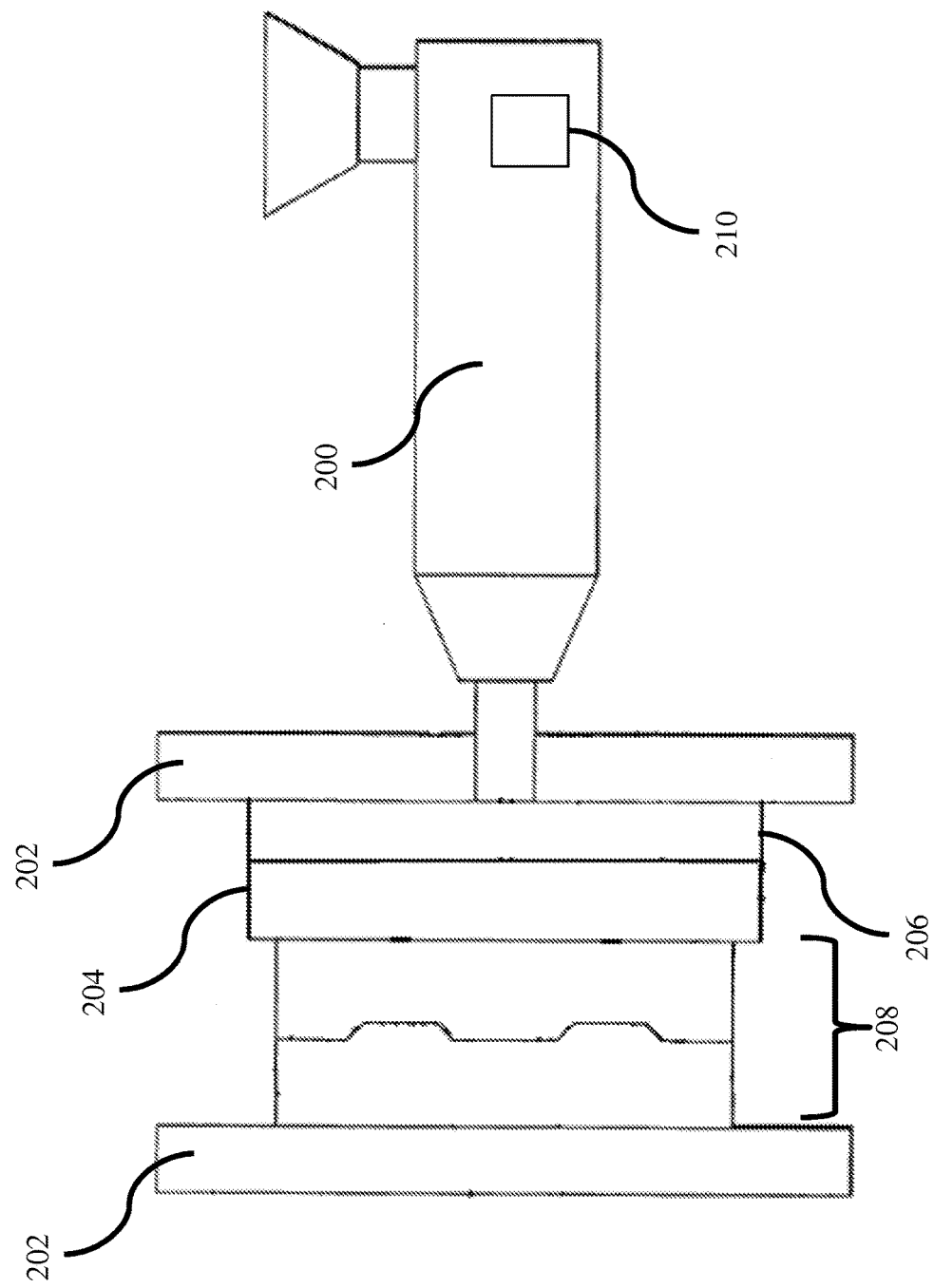
FIG. 6 is a schematic representation of an injection molding system.

One embodiment of an injection molding system incorporating a hot runner capable of implementing the currently disclosed valve stem operation is schematically depicted in FIG. 6. The depicted injection molding system includes an injection feeder 200, such as a screw/barrel system, platens 202, a hot runner 204, and a mold 208. As described above, the hot runner 204 includes a valve gated nozzle and an associated valve stem, not depicted, which may be controlled according to the current disclosure. In some embodiments, the hot runner 204 may include one or more shooting pots that are actuated by a shooting pot actuation system 206. The depicted injection molding system also includes a controller 210 as described above for controlling the actuation of the valve stems. The controller may be located on the injection molding system as depicted in the figure, or alternatively, the controller may be located separate from the injection molding system, as the current disclosure is not limited in this fashion. In some embodiments, the controller 210 only controls the valve stems. In other embodiments, the controller 210 may control a plurality, or possibly all, of the components of the injection molding system. While a particular injection molding system has been depicted, it should be understood that the disclosed injection molding system may incorporate any number of different components, may exclude some of the depicted components, and may be arranged in any number of different configurations, as the current disclosure is not limited in this fashion. Other examples of injection molding machines are described in co-owned U.S. Pat. Nos. 7,802,980 and 7,905,721, each of which is hereby incorporated by reference herein.

While the above embodiments have been directed to reducing or substantially eliminating the pressure spike associated with valve stem closure to maintain a substantially constant polymer melt pressure during valve stem closure, embodiments in which the polymer melt pressure increases during valve stem closure due to considerations other than valve stem closure are also envisioned. More specifically, as is well known in the art, the polymer melt pressure may be changed throughout the injection molding process. For example, the polymer melt may have a pressure during filling which may be different from the polymer melt pressure during packing. Therefore, if valve stem closure were to occur during a portion of the injection molding process in which the polymer melt pressure is changing due to another consideration, the polymer melt pressure would still change during valve stem closure even if the valve stem moves at or below the threshold speed during the final portions of valve stem closure to reduce, and/or substantially avoid, the creation of a pressure spike. In one specific embodiment, a packing pressure of an associated mold might be increased during valve stem closure according to the current disclosure. In such an embodiment, while the overall polymer melt pressure might increase during valve stem closure, the above noted pressure spike due to valve stem closure may still be substantially avoided.

EXAMPLES

Testing was performed to determine the effect of valve stem closure speed on remnant formation and the observed pressure spike during valve stem closure. Polypropylene polymer was used with a Husky injection molding system to mold the parts. The injection molding process included a valve stem closure with an initial closing speed and slower second closing speed during the final 2 mm of valve stem closure. The initial closing speed of the valve stems was 10 mm/s. The second valve stem closing speeds that were tested included 2 mm/s and 5 mm/s. During the injection molding process, the barrel temperature was approximately 240° C., the nozzle temperature was approximately 240° C., and the mold temperature was approximately 20° C.

The part molded with a valve stem closure speed of 5 mm/s exhibited an increased remnant and a pressure spike of approximately 500 psi was observed during valve stem closure. In contrast, the part molded with a valve stem closure speed of 2 mm/s had a reduced remnant and there was no observed pressure spike during valve stem closure.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method for molding a plastic part out of a polymer melt, the method comprising:
   providing a valve gated nozzle including a valve stem movable between an open position and a closed position;
   moving the valve stem towards the closed position at a first speed for a first portion between the open position and the closed position; and
   moving the valve stem towards the closed position at a second speed less than a threshold speed for at least a final 2 mm between the open position and the closed position, wherein the threshold speed is a speed at which the valve stem is moved such that a deformation rate of the polymer melt due to movement of the valve stem is less than or approximately equal to a relaxation rate of the polymer melt.

2. The method of claim 1, further comprising maintaining a substantially constant pressure of the polymer melt during movement of the valve stem for at least the final 2 mm between the open position and the closed position.

3. The method of claim 1, wherein the second speed is less than approximately 5 mm/s.

4. The method of claim 1, wherein the second speed is less than approximately 2 mm/s.

5. The method of claim 1, wherein moving the valve stem at the second speed further comprises moving the valve stem at the second speed for at least a final 3 mm between the open position and the closed position.

6. The method of claim 1, wherein moving the valve stem at the second speed further comprises moving the valve stem at the second speed for less than a final 10 mm between the open position and the closed position.

7. The method of claim 1 further comprising actuating a plurality of valve stems with a plurality of actuators to move the plurality of valve stems between the open position and the closed position.

8. The method of claim 1 further comprising actuating a plurality of valve stems with a plate actuator to move the plurality of valve stems between the open position and the closed position.

9. A method for molding a plastic part out of a polymer melt, the method comprising:
   providing a valve gated nozzle including a valve stem movable between an open position and a closed position;
   moving the valve stem towards the closed position at a first speed for a first portion between the open position and the closed position; and
   moving the valve stem towards the closed position at a second speed less than the first speed for a second portion between the open position and the closed position, wherein the second speed is less than a threshold speed, and wherein the second portion is between a final 10% and 70% of a distance between the open position and the closed position, wherein the threshold speed is a speed at which the valve stem is moved such that a deformation rate of the polymer melt due to movement of the valve stem is less than or approximately equal to a relaxation rate of the polymer melt.

10. The method of claim 9, wherein the second speed is less than approximately 5 mm/s.

11. The method of claim 9, wherein the second speed is less than approximately 2 mm/s.

12. The method of claim 9, wherein the first speed is between approximately 5 mm/s and 100 mm/s.

13. The method of claim 9, wherein the second portion is between a final 20% and 50% of the distance between the open position and the closed position.

14. The method of claim 9, maintaining a substantially constant pressure of the polymer melt during movement of the valve stem to the closed position.

15. The method of claim 9 further comprising actuating a plurality of valve stems with a plurality of actuators to move the plurality of valve stems between the open position and the closed position.

16. The method of claim 9 further comprising actuating a plurality of valve stems with an actuation plate to move the plurality of valve stems between the open position and the closed position.

17. A method for molding a plastic part out of a polymer melt, the method comprising:
   providing a valve gated nozzle including a valve stem movable between an open position and a closed position, wherein a stroke length of the valve stem is less than approximately 3 mm; and
   moving the valve stem towards the closed position at a speed less than a threshold speed, wherein the threshold speed is a speed at which the valve stem is moved such that a deformation rate of the polymer melt due to movement of the valve stem is less than or approximately equal to a relaxation rate of the polymer melt.

18. The method of claim 17, wherein the threshold speed is less than approximately 5 mm/s.

19. The method of claim 17, wherein the threshold speed is less than approximately 2 mm/s.

20. The method of claim 17, wherein the stroke length is less than approximately 2 mm.

\* \* \* \* \*